United States Patent Office 3,575,793
Patented Apr. 20, 1971

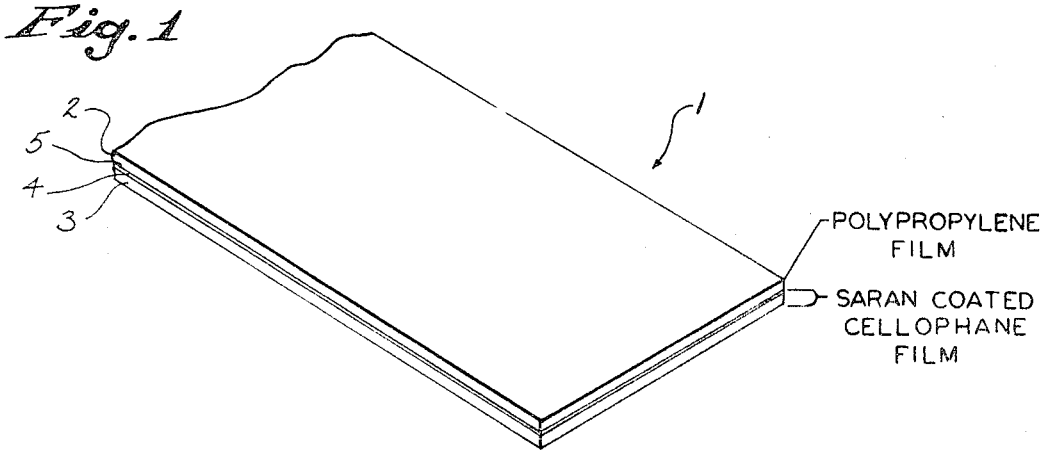
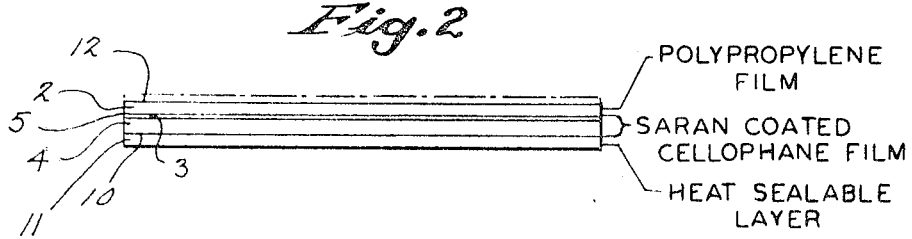
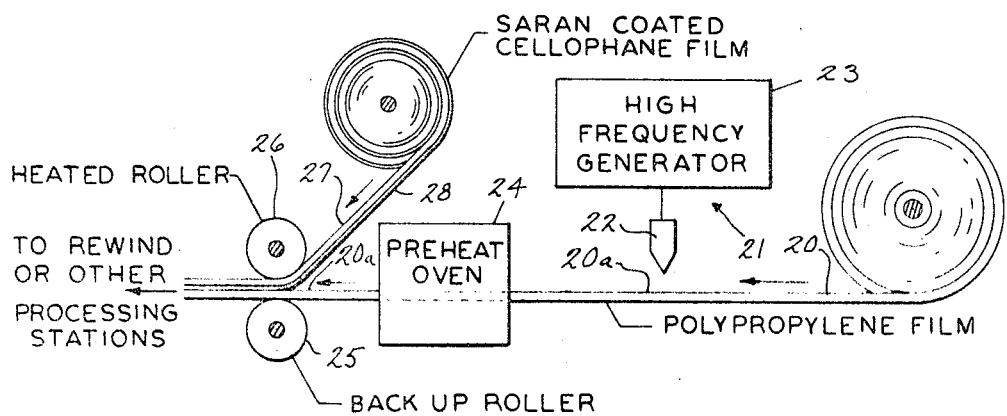

3,575,793
LAMINATE OF POLYPROPYLENE, SARAN AND CELLOPHANE AND METHOD OF MAKING SAME
George C. Paisley, Millbrae, Calif., assignor to Milprint, Inc., Milwaukee, Wis.
Filed Sept. 19, 1968, Ser. No. 760,958
Int. Cl. B32b 27/32, 27/16, 27/08
U.S. Cl. 161—249                                    4 Claims

ABSTRACT OF THE DISCLOSURE

A packaging film including a layer of biaxially oriented polypropylene film and a layer of cellophane having a saran coating on at least one of its surfaces in which two films are joined to each other without the use of any adhesive primer, anchoring coating, etc. between the contacting surfaces. The film has a corona discharge treated uncoated surface of the polypropylene joined directly to the saran coating of the cellophane to thereby form the interfacial contact zone between the two films.

BACKGROUND OF THE INVENTION (1) Field

This invention relates to packaging films formed by laminating together two preformed films (as distinguished from laminated films in which one layer may be extrusion-coated onto another) in which one of the films is polypropylene and the other is a cellophane film with at least one surface bearing a saran coating.

(2) Prior art

A number of U.S. patents pertain to laminated film structures incorporating polypropylene and saran coated cellophane layers. U.S. Pat. 3,033,707 shows a polypropylene layer joined to a saran coated cellophane layer by means of an intermediate adhesion-promoting coat or primer of polyalkylene imine. Pat. 3,274,004 illustrates the joinder of an oriented polypropylene layer to the saran surface of saran-coated cellophane through the intermediary of a layer of polyethylene. In 3,037,868 polypropylene may be sandwiched between two cellophane layers, using a resin-type anchoring agent along the interface such as polyalkylenimine or condensation products of thermosetting resins such as melamine-formaldehyde resin. A five layer film is illustrated in 3,343,663 which includes a layer of biaxially oriented polypropylene and a cellulosic layer in which polyethylene is used as a hot melt adhesive to achieve a bond between these two layers.

SUMMARY OF THE INVENTION

The present invention differs from the film products illustrated in the above patents in that a preformed film of biaxially oriented polypropylene is joined directly to the saran surface of a saran-coated cellophane preformed film without the intermediary of an adhesive, anchoring agent, primer, etc. Thus the interfacial contact zone between the polypropylene and the saran surface of the cellophane is entirely free of any adhesive. It has been found that, if the polypropylene surface which is to be joined to the cellophane is first subjected to corona discharge treatment, a bond strength satisfactory for packaging uses can be obtained by laminating the polypropylene film directly to the saran surface of the coated cellophane. The films are laminated together upon the application of heat and pressure. In the films of this invention, the interfacial contact between the polypropylene and cellophane layers is a direct contact between a corona discharge treated polypropylene surface and a saran surface of the saran coated cellophane.

The present invention thereby eliminates the need for any type of adhesive between the polypropylene and the saran coated cellophane, resulting in a reduction of the procedures required for manufacture of the laminate and a reduction in the materials needed for the film. Furthermore, a film of increased clarity can be achieved, as compared to the same films laminated with some type of adhesive. There is no need to evaporate solvent, nor dry a coating before achieving a proper bond, and the process lends itself to a facile in-line techniques since it utilizes two preformed films which are self-supporting at room temperature.

Other film layers can be joined to either the polypropylene surface opposite the polypropylene-saran interface or on the cellophane surface opposite from such interface. Heat sealable polyethylene, for example, can be applied to the aforesaid cellophane surface to form a heat sealable packaging film. Other heat sealable coatings or layers, barrier layers, other functional or decorative coatings or films can be applied to either polypropylene or cellophane surfaces on opposite sides of the interfacial contact zone between the two films.

The laminating packaging films of the present invention can be employed in various packaging applications for both food and non-food items. They may be used in the form of pouches, bags, or wrapping sheets, and can be employed on automatic or semi-automatic packaging machines which form vacuum or gas-flushed packages.

DESCRIPTION OF THE DRAWINGS

Several examples are described in detail in the following description as illustrative, not limiting, presently-preferred embodiments of this invention. All of the various embodiments in which this invention may be practiced are not described, however, and other forms of laminated film products within the scope of the present invention will be suggested to those skilled in the art. The description is made with reference to the accompanying drawings, wherein:

FIG. 1 is a perspective view, on an enlarged scale, of a sheet of laminated film according to the present invention.

FIG. 2 illustrates an end view of a film of this invention; and

FIG. 3 is a schematic representation of a process for the production of the films of this invention.

DESCRIPTION OF THE PREFERRED EMBODIMENTS

The sheet 1 of film illustrated in FIG. 1 comprises a layer of biaxially oriented polypropylene film 2 joined to a cellophane film 3 having a saran coating 4 on one of its surfaces. The joinder between the two films is between a polypropylene surface and the saran coating 4 on the cellophane film. In this fashion, the inetrfacial contact zone as shown by the reference numeral 5 in FIG. 1 is a direct polypropylene-to-saran contact, and there is to be no adhesive, anchoring coat, or o ther chemical intermediary between the polypropylene surface and the saran surface along the interfacial zone.

Turning now to FIG. 2, the cellophane surface 10 opposite from the interfacial zone 5 can be coated or laminated to a heat sealable layer, such as heat sealable branched chain polyethylene indicated by the layer 11. Other types of functional coatings or layers can be joined to the surface 10 of the cellophane, depending upon the ultimate end use of the composite product. Furthermore, a coating or film can be applied to the surface 12 of the polypropylene film opposite from the interfacial contact zone 5 as indicated by the dotted lines. Again, this layer may be functional such as a heat sealable layer or barrier layer, or decorative such as a printed film, layer of printing or a metallic foil. Thus the basic combination of polypropylene joined to the saran coated cellophane can be employed in various other combinations to provide the desired final product.

FIG. 3 illustrates a useful process for the production of the laminated films of the present invention. The web 20 of preformed polypropylene film (i.e. the polypropylene is a self-supporting film at room temperature) is unwound from a supply roll thereof and advanced past a treating station 21. At the treating station, an electrode 22 is connected to a suitable high frequency generator 23 so as to subject the surface 20a of the polypropylene web 20 underneath the electrode to corona discharge treatment. A typical generator for this purpose is model HFSG–2 high frequency generator manufactured by Lepel High Frequency Laboratories, Inc., which develops an output power having a frequency of approximately 450 kilocycles with an input current of 1½ kilowatts, 60 cycles at 115 or 230 volts. Other suitable high frequency generators are available and known in the art. The corona discharge treatment of polyolefin surfaces, which is thought to produce a surface oxidation effect, is well known and widely practiced in the production of packaging films, particularly to provide a printable surface. The level of treatment ordinarily used to make polypropylene printable, or receptive to printing inks, is suitable for the practice of this invention. Suitable treating processes are described in detail in U.S. Pat. 2,939,956 to Parks and in U.S. Pat. 3,018,189 to Traver, the disclosures of which are incorporated in by reference relative to "corona discharge treatment."

After passing beneath the electrode 22, the web 20 of polypropylene film, now having one of its surfaces corona discharge treated, is led through a preheat oven 24 which is maintained at a temperature in the range of 120° to 220° F., and preferably within the range of 160° to 180° F. After emerging from the preheat oven the polypropylene film is advanced to a laminating station shown herein as comprising a pair of spaced pressure rollers 25 and 26. A web 27 of cellophane film (also a preformed self-supporting film at room temperature), and having a saran coating 28 on one of its surfaces is unwound from a supply roll thereof and also led to the laminating station. The saran coating 28 of the cellophane web is in intimate contact with the corona discharge treated surface 20a of the polypropylene web 20. Upon passage through the nip of the pressure rollers 25 and 26, the two films are laminated together. (Other suitable laminating means can also be used.) The roller 25 in contact with the web 20 of polypropylene is a rubber or rubber covered backup roller, and the roller 26 which contacts the web 27 of cellophane is a steam heated metal roll with a surface temperature high enough to soften the saran coating sufficiently to become bonded to the polypropylene, but not so high as to cause physical distortion, such as wrinkling and puckering, of the thermally-sensitive oriented polypropylene film; roll surface temperatures within the range of about 180° to 220° F. have been found satisfactory. Sufficient pressure is exerted upon the two webs as they pass between the rolls 25 and 26 to form a bond along the saran-to-polypropylene interfacial contact zone. After passing through the rollers 25 and 26, the composite film is led to a rewind station or it may be advanced to further processing steps wherein other films or additional coatings are applied to either the cellophane surface or the polypropylene surface on opposite sides of the contact zone. Thus to form the article as illustrated in FIG. 2, the composite film may be led past an extrusion coater station at which a layer of heat sealable polyethylene can be applied to the cellophane surface opposite from the interfacial contact zone. In the preceding process, preheating of the polypropylene can take place prior to corona discharge treatment, instead of after treatment as described above.

The term "cellophane" as used in this description and claims is defined as meaning films derived from regenerated cellulose and cellulose ethers. The regenerated cellulose films can be prepared by the usual viscose process, from cuprammonium solutions, or by regenerating cellulose from cellulose ethers or esters Cellulose esters which can be used include hydroxyalkyl ethers, particularly hydroxyethylcellulose; alkyl ethers such as methyl and ethyl cellulose; and carboxyalkyl ethers such as carboxymethyl cellulose. The term "saran" or "saran polymer" as used in the description and claims is defined as homopolymers and interpolymers of vinylidene chloride having high impermeability to vapors, the commercial sarans generally comprise a binary or ternary interpolymer having 50% or more vinylidene chloride and the balance one or more monoethylenically unsaturated copolymerizable monomers such as vinyl chloride, alkyl methacrylates, and acrylates, acrylonitrile, and acrylic acid or methacrylic acid. Most commercial sarans have over 60%, and generally 85% to 95%, by weight, of vinylidene chloride. The saran coating is best applied from a solvent solution to the cellophane. Other saran interpolymers of vinylidene chloride may also be employed, particularly those containing at least 25 weight percent of vinylidene chloride in the polymerized molecule and the balance one or more other monoethylenically unsaturated monomers that are copolymerizable with vinylidene chloride.

EXAMPLE 1

A web of .0005 inch thick biaxially oriented polypropylene film was unwound from a supply roll thereof, the web being a preformed self-supporting film at room temperature, and advanced past an electronic treating unit where one of its surfaces was corona discharge treated. The treated film was fed through a preheat oven with an ambient temperature of 180° F., and thereafter led to the nip of a laminating roll assembly. A web of 250 RSO cellophane, having a saran coating one side and being about 0.8 mil thick, was withdrawn from a supply roll thereof and also fed to the nip of the laminating roll assembly. The laminating assembly included an internally heated metal roller with a surface temperature of 190° F. and a backup roller on the opposite side of the two films. The films were thereupon laminated together with the saran coating of the cellophane in contact with the corona discharge treated surface of the polypropylene web. The composite film was led to a rewind assembly. Thereafter, a coating of heat sealable low density polyethylene was applied to the uncoated surface of the cellophane opposite from its saran coated surface that was laminated to the corona discharge treated surface of the polypropylene.

The finished film had a basis weight of 52.9 pounds per ream (3,000 square feet), and an average thickness of 3.41 mils. The bond strength along the saran-to-polypropylene interfacial contact zone was measured to be 220 grams per inch of width. The material was heat sealable in a range of 275° to 325° F. and produced heat seals with an average strength of 6400 grams/inch. The film had a moisture vapor transmission rate of 0.26 gram per one hundred square inches per day, at 100° F. and 90% relative humidity difference according to TAPPI Test Method 464m, and an oxygen gas transmission rate of 0.42 cc. per one hundred square inches per day per atmosphere (ASTM D–1434). Other physical properties of the film included a tensile strength of 7920 p.s.i. in the machine direction and 7190 p.s.i. in the cross direction (ATSM D–882).

For comparison purposes, the same polypropylene film used above was laminated to the same saran coated cellophane by first applying a coating of thermoplastic adhesive (a saran composition) to the polypropylene surface (which surface was first corona discharge treated as above) and then joining the two films together with the coating on the polypropylene in contact with the saran coating on the cellophane. The same oven preheat and laminating roll temperature conditions were employed. It was found that the film of this type exhibited a basis weight of 54.4 pounds per ream with a thickness of 3.52 mils; the bond between the coated polypropylene layer and the cellophane layer measured at 300 grams per inch, and the film had a tensile strength of 7950 pounds in the machine direction and 7100 pounds in the cross direction (ASTM D–882). Heat seals of 6470 grams per inch were obtained at temperatures of 275° to 325° F. The moisture vapor transmission rate was 0.27 gram per one hundred square inches of film per day at 100° F. and 90% relative humidity difference (TAPPI 464m), and the oxygen gas transmission rate was 0.50 cc. per 100 square inches of film per day per atmosphere (ASTM D–1434). The surprising result of this comparative example is that the film according to this invention which did not use any adhesive between the polypropylene and the saran coating of the cellophane layer showed a bond strength at the polypropylene and cellophane interface of approximately 75% that of the second film which used a thermoplastic adhesive to achieve the bond. Furthermore, the moisture vapor transmission rates of the adhesiveless laminate was almost the same as that for the adhesive laminated film, and the oxygen gas transmission rate was somewhat improved. The heat seal strnegths of the two films are almost identical. Thus, it can be said that the film of Example 1 produced according to this invention exhibited properties as a packaging film which substantially matched those of film using the same preformed film layers but incorporating an adhesive along the interfacial contact zone in order to achieve a bond.

As another comparison, the same biaxially oriented polypropylene film exhibited no adhesion to the same saran coated cellophane when it was attempted to laminate the two films together under the same operating conditions but without corona discharge treatment of the polypropylene.

EXAMPLE 2

The procedure of Example 1 was repeated except that the biaxially oriented polypropylene film was .00075 inch thick, and was joined to the 250 RSO cellophane with a 205° F. nip temperature at the laminating roll assembly.

The film of Example 2 exhibited excellent bond strength along the interface between the corona discharge treated polypropylene surface and the saran coating, which bond strength was sufficient to cause the film to rupture before delamination along the interface took place.

One of the further surprising aspects of the present invention is that the achievement of a bond satisfactory for a packaging film is critical upon the use of biaxially oriented polypropylene film for the one layer and saran coated cellophane for the other. The 250 RSO cellophane film used in Example 1 was combined with two other films as follows: (1) a non-oriented polypropylene film having a corona discharge treated surface, and (2) a biaxially oriented polypropylene film having a polyethylene coating on each of its two surfaces, one of which was corona discharge treated. Using the procedure of Example 1, no bond whatsoever was developed between the cellophane and the corona treated surfaces of the non-oriented polypropylene film or the polyethylene coated biaxially oriented polypropylene film. In another test, the biaxially oriented polypropylene film of Example 1 was combined with (1) a nitrocellulose coated cellophane and (2) a saran coated Mylar (polyetrylene terephthalate) film, again using the same process as in Example 1. Again, no bond was achieved in either instance. The reason why the use of the two specified films is so critical is not presently known, but it is imperative that the one film be biaxially oriented polypropylene and the other a saran coated cellophane in order to achieve, without the use of adresives or primers, a polypropylene-to-saran coating bond of sufficient strength to be useful in packaging applications.

The polypropylene film suitable for the present invention may be, and the term "polypropylene film" as used herein and in the claims is defined as, a homopolymer of propylene, or an interpolymer of propylene with other copolymerizable alpha olefins such as ethylene, butene-1, etc. which contain at least 50% propylene, or a blend containing a major amount of the foregoing propylene homopolymers or interploymers. The film may be in the range of ½ to 2 mils thick for most packaging uses. The polypropylene film layer is to be biaxially oriented according to techniques well known in the art of film manufacture. The film ordinarily will be oriented by stretching from two to ten times, and preferably about five times, its original dimensions in both the machine and transverse directions. After stretching, the film may be given a heat treatment in the range of 120° C.–150° C. for about one to ten seconds while permitting the film to retract between 10% and 30% in its transverse direction and up to 15% in its machine direction; after which additional stretching in the machine direction on the order of ½% to 5% at 100° C. may take place. Biaxial orientation of polypropylene film is further described in U.S. Pat. 3,257,490.

As has been described above, the laminated film of the present invention is characterized by a direct contact between a corona discharge treated polypropylene surface and the saran surface of a saran coated cellophane film. Best results are obtained when there is no printing on either the polypropylene surface or the saran coating along the interfacial contact area since printing ink prevents the formation of a satisfactory bond. However, if the interfacial area is only partly printed, or carries a limited amount of printing, bonds can be formed between the unprinted zones of the polypropylene and the saran coating, which bonding can be satisfactory in some uses. In general, it has been found preferable to reverse print the uncoated surface of the cellophane (i.e. the cellophane surface opposite from the polypropylene-to-saran interface), especially when the polypropylene layer forms the exterior of the finished film.

The films according to this invention, such as shown in FIG. 2, have proved highly useful for wrapping cheese; they exhibit excellent machineability in automatic packaging machinery, are of a high clarity, and excellent heat sealability. Air-tight packages of the gas flushed type were readily formed, and the packaged cheese withstood the rigors of truck transportation with only an acceptable minimum number of leaking packages resulting from such transport.

I claim:
1. A method for the manufacture of a laminated film including a biaxially oriented polypropylene film and a cellophane film having a saran coating on one of its surfaces, the polypropylene and cellophane films each being preformed to be self-supporting films at room temperature, comprising the steps of:
   (1) subjecting the polypropylene film to corona discharge to provide a corona discharge treated first surface thereon,
   (2) joining the two films with the corona discharge treated first surface of the polypropylene film in contact with the saran coating of the cellophane film, and
   (3) laminating the films together upon the application of heat and pressure.

2. A method according to claim 1 further including the step of:
   preheating the polypropylene film at a temperature of about 120° to 220° F. before it is joined with the cellophane film.

3. A laminated packaging film including a preformed biaxially oriented polypropylene film joined to a preformed cellophane film along an interfacial contact zone, wherein:
- the polypropylene film has a corona discharge treated first surface, and the cellophane film has a saran coated first surface, and
- the interfacial contact zone between the two films consists of said corona discharge treated first surface of the polypropylene film joined directly to and in intimate contact with said saran coated first surface of the cellophane film.

4. The film of claim 3, further including:
- a heat sealable layer adherent to a second surface of the cellophane film opposite from said first surface thereof.

References Cited
UNITED STATES PATENTS

| | | | |
|---|---|---|---|
| 2,968,576 | 1/1961 | Keller et al. | 161—254 |
| 3,075,868 | 1/1963 | Long | 156—82 |
| 3,445,324 | 5/1969 | Curler et al. | 161—254 |
| 3,459,591 | 8/1969 | Konishi et al. | 161—254 |

JOHN T. GOOLKASIAN, Primary Examiner

W. E. HOAG, Assistant Examiner

U.S. Cl. X.R.

117—145, 161; 156—272, 306, 320; 161—254, 256